Sept. 10, 1929.　　　R. BIELSKI　　　1,728,030
SHAPING MACHINE
Filed Oct. 11, 1928
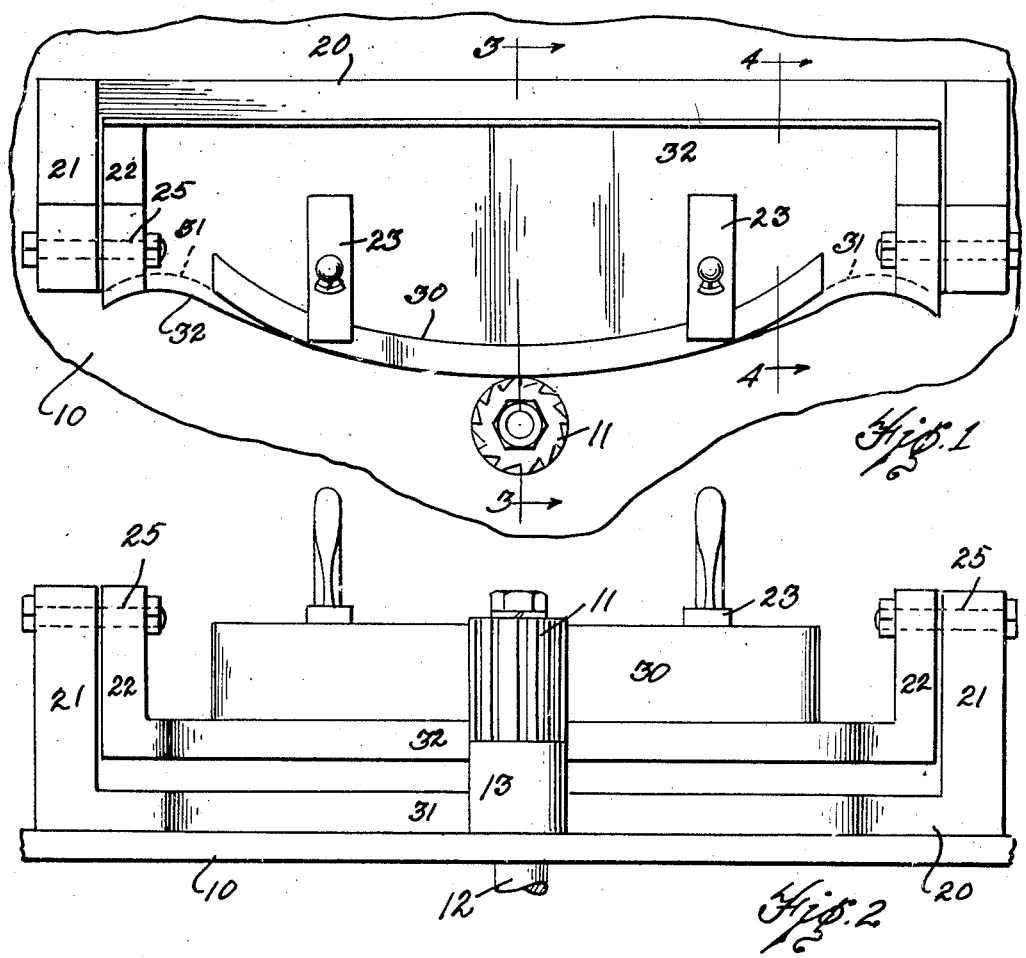
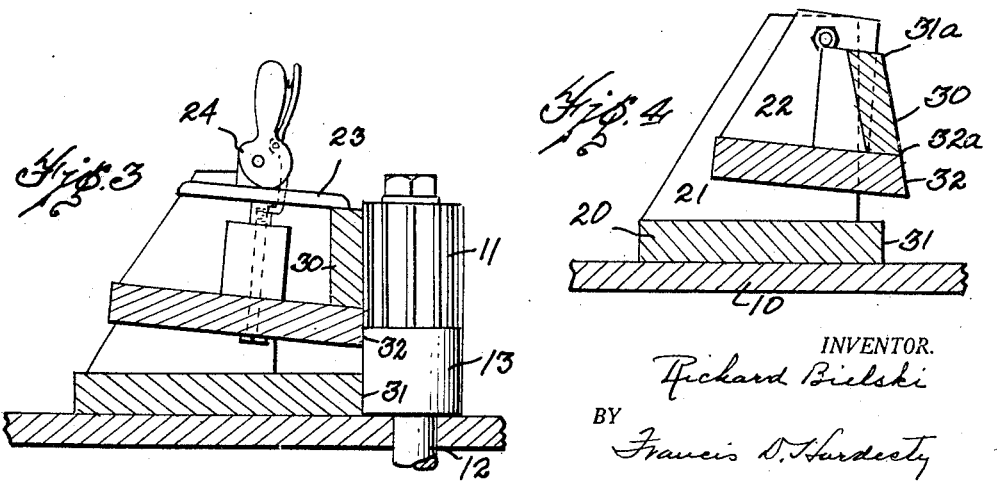
INVENTOR.
Richard Bielski
BY
Francis D. Hardesty
ATTORNEY.

Patented Sept. 10, 1929.

1,728,030

UNITED STATES PATENT OFFICE.

RICHARD BIELSKI, OF DETROIT, MICHIGAN.

SHAPING MACHINE.

Application filed October 11, 1928. Serial No. 311,780.

The present invention relates to devices for shaping materials particularly such as wood.

In the manufacture of automobile bodies or other structures in which curved contours are often used it frequently happens that the metal or other sheathing is curved in somewhat peculiar fashion so that the supporting frame work must be curved accordingly. This frequently results in the necessity for frame members which are beveled and tapered at the same time and which require other peculiarly shaped pieces. Such shaped pieces are extremely difficult to produce in quantities and have them exactly similar in shape and size if produced by ordinary methods.

The usual method consists in laying out the shape of the piece on a block of suitable size shaping it by hand or by guiding it by hand over the well-known cutting or shaping machine. This operation calls for a very high degree of skill and even then results in small differences in the parts so that they must subsequently be worked by hand to make them conform to the desired accurate dimensions.

One of the pieces used in considerable numbers in automobile bodies is a piece of wood which is bowed in shape but which is not uniform in its curvature and which is also beveled and in which the bevel is not uniform throughout its length.

Among the objects of the invention is a work-holder and manipulator which is specially adapted to produce such curved pieces.

Another object is a device of the kind indicated by means of which such pieces may be shaped by unskilled workmen and yet be made of exact dimensions and interchangeable.

Still other objects will be readily apparent to those skilled in the art upon reference to the following description and the accompanying drawings, in which Fig. 1 is a plan view of the device showing the work piece in position and indicating its use with a well-known shaper machine.

Fig. 2 is a front elevation of the device shown in Fig. 1.

Fig. 3 is a section on line 3—3 of Fig. 1.

Fig. 4 is a section on line 4—4 of Fig. 1.

In the drawings the table of the shaper machine is indicated at 10 with the cutter at 11 which cutter is mounted on a shaft 12 having a collar 13 thereon above the shaper table and supporting the cutter 11.

The device forming the subject matter of the present invention consists of a cradle or base member 20 having at its ends the upstanding arms 21 between which is swung a second cradle 22 of similar shape and upon which is mounted a pair of clamps 23 adapted for quick operation through the use of the handles 24.

The cradle 22 is so mounted in the base 20 as to swing upon suitable shafts 25 and the work-piece 30 clamped upon it near the front edge thereof by means of the clamps 23.

It will be understood that the present device is designed for the production of a particular frame piece and if it is desired to form some other frame piece the necessary changes must be made therein.

It will be noted that the front edge of the base of carrier 20 is curved as indicated by the dotted line 31 in Fig. 1 and the edge of the cradle 22 lying above edge 31 is also curved as indicated at 32. The curve of edge 31 is substantially that of the upper edge 31$^a$ of the work-piece while the curve of the edge 32 is the same as the curve 32$^a$ of the work-piece. In the present instance the work piece is shown as beveled more near its ends than at its center and this being accomplished by providing the cradles with the proper curves at 31 and 32 pressing against the collar 13 of the cutter and maintained against said collar during movement of the work-piece 30 over the cutter. The cradle 22 is automatically swung backward as the cutter nears the end of the work and the swinging about the shafts 25 consequently tilts the work 30 as it is presented to the cutter. At the central portion of the work the edge 32 and 31 are shown as substantially vertical and in alignment but as the cutter nears the end of the work the two cradles become increasingly relatively displaced and a consequent increasing bevel is produced on the work.

By placing the shafts 25 forward or backward of the position shown, different bevels may be produced, or, by placing them above or below the position shown, similar differences in effect may be obtained.

Now having described the invention and the preferred forms of embodiment thereof, it is to be understood that the said invention is to be limited not to the specific details herein described and illustrated but only by the scope of the claims which follow:

I claim:—

1. A device for shaping wood frame members comprising a cutter having a smooth cylindrical portion at one end of the cutter blades and a carrier for the work piece consisting of a base having a swinging cradle thereon to which cradle the work piece is secured, said base and said cradle each having shaped forward edges adapted to cooperate with said cylindrical cutter portion when the work piece is moved over said cutter, to thereby determine the contour produced thereby on said work piece.

2. In combination with a shaping machine having a horizontal table and a cutter rotatable on a vertical axis, a work carrier consisting of a base having an edge adapted to be presented to a smooth surface on said cutter to guide said base, a cradle mounted on said base and movable relatively thereto, said cradle being also provided with a shaped edge adapted to be pressed against said cylinder portion and means for securing a work piece on said cradle, the base and cradle being movable to present the said edges to said cylindrical portion and said work piece to said cutter as said device is moved over said table in contact with said cutter.

RICHARD BIELSKI.